United States Patent [19]

Breen

[11] 4,295,715

[45] Oct. 20, 1981

[54] CAMERA MECHANISM EMPLOYING A MULTIFUNCTION CONTROL MEMBER

[75] Inventor: John J. Breen, West Henrietta, N.Y.

[73] Assignee: Eastman Kodak Company, Rochester, N.Y.

[21] Appl. No.: 103,259

[22] Filed: Dec. 13, 1979

[51] Int. Cl.³ .............................................. G03B 3/10
[52] U.S. Cl. .................................... 354/25; 354/196
[58] Field of Search ................. 354/25, 196; 352/140, 352/141; 355/56

[56] References Cited

U.S. PATENT DOCUMENTS

| | | | |
|---|---|---|---|
| 3,522,764 | 8/1970 | Biber | 95/44 |
| 3,618,499 | 11/1971 | Harvey | 354/196 X |
| 3,917,395 | 11/1975 | Ogawa | 354/23 D |
| 3,945,023 | 3/1976 | Stauffer | 354/25 |
| 4,079,387 | 3/1978 | Kawamura et al. | 354/23 D |
| 4,199,235 | 4/1980 | Matsuda et al. | 354/196 X |
| 4,203,661 | 5/1980 | Beschmatter | 354/196 X |

FOREIGN PATENT DOCUMENTS 2839979  3/1979  Fed. Rep. of Germany ...... 354/196

Primary Examiner—L. T. Hix
Assistant Examiner—W. J. Brady
Attorney, Agent, or Firm—Thomas H. Close

[57] ABSTRACT

A control mechanism for use in a photographic camera featuring automatic focus and automatic exposure includes a control circuit responsive to scene parameter inputs, including at least subject distance and scene brightness, for controlling the adjustment of both the focus position and the aperture size through a multifunction control member.

4 Claims, 6 Drawing Figures

CAMERA MECHANISM EMPLOYING A MULTIFUNCTION CONTROL MEMBER

BACKGROUND OF THE INVENTION

1. Field of the Invention

The present invention relates to photographic apparatus and more particularly to apparatus for controlling focus and exposure in an automatic camera.

2. Discussion Related to the Problems

Automatic cameras are known which feature both automatic focus and automatic exposure control. Typically, in such an automatic camera, an electronic control circuit responsive to signals produced by input transducers (usually photoelectrical devices such as photocells) produces electrical control signals for controlling the camera mechanism by means of electromechanical output transducers. An output transducer is required for each camera function which is independently controlled. A very popular type of output transducer is the servo motor. However, as the number of automatically controlled camera functions increases to include, for example, focus, aperture size, film winding and shutter cocking, the corresponding proliferation of servo motors results in bulky and expensive apparatus. A goal, therefore, has been to minimize the number of such motors in the camera. An example of an automatic camera wherein one motor controls focus, advances film and cocks the shutter is shown in U.S. Pat. No. 3,917,395 issued to Ogawa on Nov. 4, 1975, and entitled CONTROL CIRCUIT FOR PHOTOGRAPHIC APPARATUS.

In the apparatus shown by Ogawa, however, the aperture size cannot be controlled independently of the exposure time. The relation between aperture size and shutter time is determined by the mechanical design of the shutter. Commonly assigned and copending U.S. Patent Application Ser. No. 103,260 entitled METHOD AND APPARATUS FOR AUTOMATIC CONTROL OF A PHOTOGRAPHIC CAMERA by Schauffele et al, filed on the same day as the present application, discloses a technique and apparatus for determining the optimum settings in a camera having an adjustable lens and adjustable aperture size and shutter time. In an automatic camera employing this technique, the aperture size and shutter time must be independently controllable. The problem faced by the present inventor was to provide a control mechanism in which all these adjustments are made automatically and mechanically independently of each other while minimizing the use of servo motors and the complexity of the apparatus.

SOLUTION—SUMMARY OF THE INVENTION

According to the invention, a control mechanism for use in a photographic camera featuring automatic focus and automatic exposure control, including independently controllable aperture size and shutter time, is built around a multifunction control member which can be moved from an initial position to a final position to initiate a photographic operation. A position sensor associated with the multifunction control member provides a signal representing the position of the control member as it moves. Both an adjustable lens and a variable sized aperture have followers which follow the movement of the control member to provide a range of focus positions and aperture sizes. A lens arresting means such as an electromechanical brake is adjusted, upon receipt of a focus control signal, to arrest further movement of the adjustable lens, to determine thereby the focus position. Similarly, an aperture arresting means, such as another electromechanical brake, is adapted upon receipt of an aperture control signal to arrest further movement of the variable sized aperture, to determine the camera aperture. A control circuit receives the position signal from the position sensor and produces the focus and aperture control signals.

In a preferred embodiment of the invention, the position sensor associated with the control member comprises a comb-shaped conductive track and a wiper adapted to move relative thereto in response to movement of the control member, to produce a series of pulses employed by the control circuit for determining the position of the control member. The apparatus further includes a shutter having a latch that opens the shutter in response to movement of the control member to its final position. Also featured is a means for returning the control member to its initial position after a photographic operation and a means, responsive to the return movement of the control member, for returning the lens and aperture to their respective initial positions and for cocking the shutter.

DESCRIPTION OF THE DRAWINGS

The invention will be described with reference to the following drawings wherein.

The Camera Control Mechanism

Figure 1:
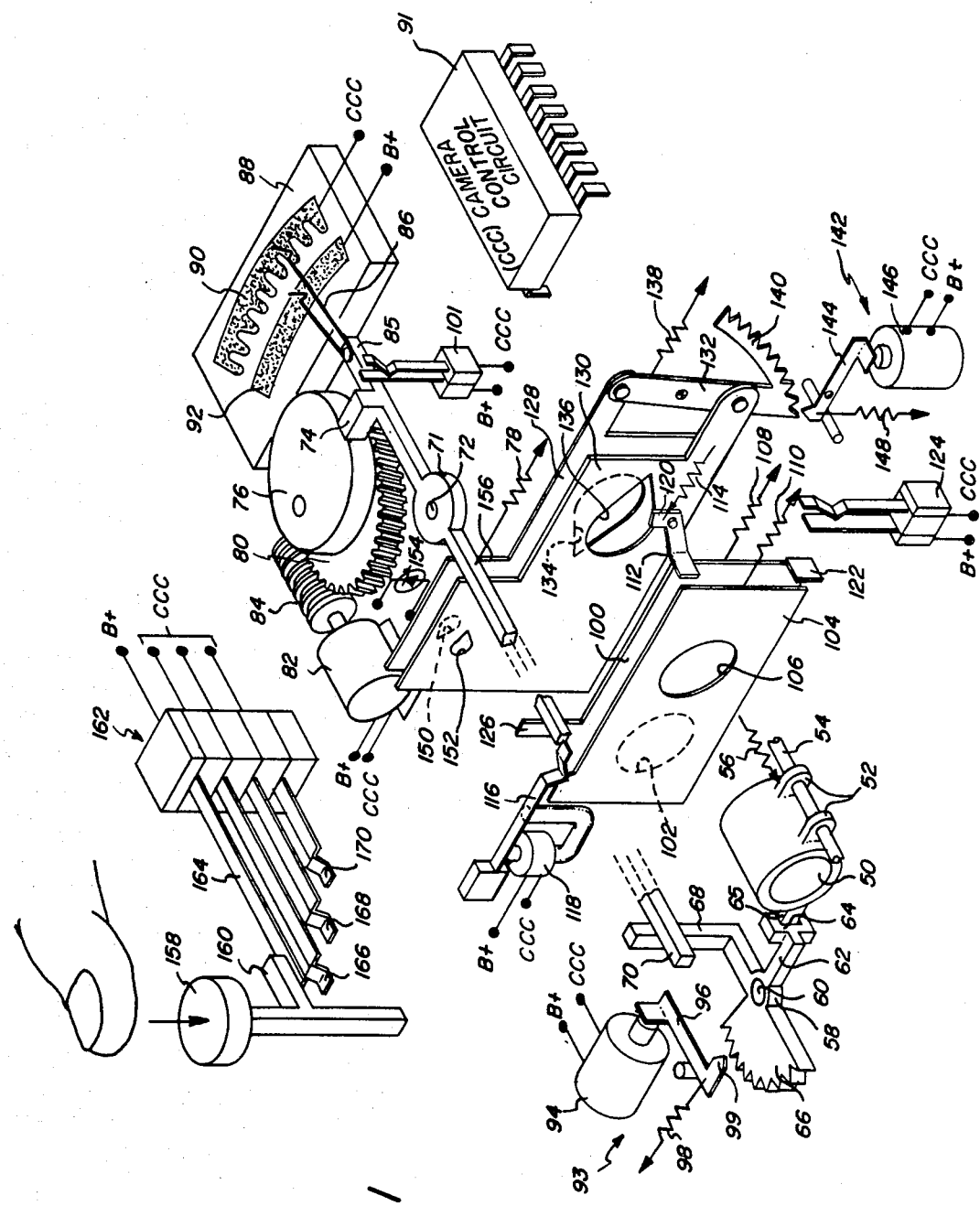
FIG. 1 is an exploded perspective view of a preferred embodiment of the camera control mechanism according to the present invention.

FIG. 1 illustrates a camera control mechanism according to a preferred embodiment of the present invention. The mechanism includes a movable lens element 50 having a pair of tabs 52 by which the lens element is constrained to slide to and fro on a support rod 54. The lens element 50 is urged in a forward direction, as shown in FIG. 1, by a spring 56. A crank 58 mounted on a pivot pin 60 includes a leg 62 with a forked nose portion 64 which is adapted to engage a tab 65 on the side of the lens element 50. The crank also has a ratchet sector 66 and an offset arm 68. Nose 64 of crank 58 is urged into contact with tab 65 of lens element 50 by the engagement of arm 68 with a forearm 70 of a multifunction control lever 71 arranged to pivot about a pin 72. Multifunction control lever 71 is so-called because the one lever is employed to determine the positions of both the lens and an aperture, as described below. Control lever 71 has a cam follower portion 74 which is urged into contact with a cam 76 by a spring 78. The cam 76 is attached to a gear 80 which is arranged to be driven by a motor 82 through a worm gear 84. As shown in FIG. 1, the lens element 50 is held by control lever 71 through crank 58 in a far focus position.

When motor 82 is energized to rotate cam 76 counterclockwise, as shown in FIG. 1, spring 78 pivots the control lever 71 counterclockwise about pin 72, thereby moving forearm 70 away from crank arm 68, thus allowing spring 56 to urge the lens element in a forward direction toward a closer focus position. A rear arm 85 of control lever 71 carries a wiper contact 86 which cooperates with a position sensor 88. The position sensor 88 comprises a comb-shaped control track 90 and a return track 92. Wiper contact 86 provides a circuit path from the control track to the return track each time a tooth of the comb is passed, thereby producing a series of pulses which may be employed by a camera control circuit 91 to determine the instantaneous position of lens element 50 while motor 82 is running.

In operation, when a number of pulses corresponding to the desired position for lens element 50 has been generated, an electromagnetic latch, generally designated 93, is energized to arrest the forward travel of lens element 50. The electromagnetic latch comprises an electromagnet 94 adapted to attract a pivotally mounted latch arm 96 toward its latching position. A spring 98 is mounted to bias the latch arm away from its latching position. When the electromagnet is energized, the magnet attracts one end of the latch arm causing a tooth 99 on the opposite end to engage ratchet sector 66 of crank 58, thereby stopping the lens at the desired position.

After a picture has been taken, motor 82 is energized to rotate cam 76 and return the control lever 71 to the position shown in FIG. 1. Forearm 70 of the control lever engages and displaces crank arm 68 to return the lens to its initial position. A switch 101 is positioned to be closed by the returning extension 85 of control lever 71 to signal the control system to stop the motor.

Behind the lens is a shutter mechanism having an opening blade 100 with a circular aperture 102 and a closing blade 104 with a circular aperture 106. A spring 108 urges the opening blade to the right, as shown in FIG. 1, and another spring 110 urges the closing blade to the right. In the initial closed position, as shown in FIG. 1, the aperture of the closing blade is aligned with the optical path of lens element 50, but light is blocked by the opening blade whose aperture is out of alignment with the optical path. The opening blade 100 is held in the closed position by a latch 112 which is urged toward its latching position by a spring 114. An electromagnetic latch comprising a cantilevered keeper arm 116 and an electromagnet 118 is adapted, when energized, to hold closing blade 104 in the position shown in FIG. 1.

In operation, after forearm 70 of control lever 71 has moved sufficiently to allow the maximum forward movement of lens 50, the forearm 70 encounters an upward extension 120 of latch 112, causing the latch to pivot against the force of spring 114 to release the opening blade for movement to the right under the influence of spring 108. The opening blade travels to the right until the aperture 102 is aligned with the optical path of lens element 50. A tab 122 on the opening blade encounters a switch 124 which is positioned to be closed by the tab to signal the automatic control system that the shutter is open and that motor 82 should be stopped. Alternatively, switch 124 may be positioned to be closed by forearm 70 just before latch 112 is released, to provide mechanical compensation for shutter lag.

After a period of time determined by the camera control circuit 91, electromagnet 118 is de-energized, thereby releasing closing blade 104 for movement to the right under the influence of spring 110 to terminate the exposure. Subsequently, motor 82 is restarted, causing cam 76 to complete one full revolution, thereby returning the control lever to the position shown in FIG. 1. Upon its return, forearm 70 of control lever 71 encounters an upward extension 126 on opening blade 100 to return the opening blade to its initial position. Tab 122 of the opening blade picks up closing blade 104 to return the closing blade to its initial position. When the initial position is reached, spring 114 urges latch 112 into latching engagement with opening blade 100.

An adjustable aperture, comprising a first aperture blade 128 and a second aperture blade 130, is disposed directly behind the shutter. The two aperture blades are constrained to move in opposite directions by a walking beam 132 which is centrally pivoted and pinned at opposite ends to the blades. Each of the blades has a teardrop-shaped opening, 134 and 136 respectively. When the aperture blades are in their initial position, as shown in FIG. 1, the largest parts of the openings are in alignment to provide the maximum effective aperture. A spring 138 urges walking beam 132 in a clockwise direction, as shown in FIG. 1, to form progressively smaller apertures. The walking beam carries a tooth sector 140 which is adapted to be engaged by a latch generally designated 142. The latch comprises a pivotally mounted pawl 144 and an electromagnet 146. A spring 148 urges the pawl away from latching engagement with tooth sector 140. When the electromagnet 146 is energized, the pawl is pulled into engagement with the tooth sector to stop the aperture at the position determined by the control system.

The aperture blades also possess a secondary set of apertures 150 and 152 which are disposed in the optical path of a photocell 154 to reduce the light falling on the photocell as apertures 134 and 136 reduce the lens aperture. The photocell is arranged to receive light from the scene, preferably the central portion thereof where a main subject presumably would be located. The aperture blades are held in their initial position by engagement of the forearm 70 of control lever 71 with an upwardly projecting portion 156 of the first aperture blade 128.

In operation, as lever 71 pivots in the counterclockwise direction, spring 138 causes blade 128 to follow forearm 70 of lever 71, thereby forming progressively smaller apertures in alignment both with lens 50 and with photocell 154. The aperture size is directly related to the number of pulses produced by position sensor 88. When a predetermined position is reached, the camera control circuit 91 energizes latch 142 to stop the aperture in the desired position. After an exposure, forearm 70 of control lever 71 returns the aperture to the maximum opening.

A body release member 158, which is accessible to the camera operator, has a leg 160 which is adapted to engage a switch bank 162 when the body release member 158 is depressed. The switch bank progressively supplies power from contact 164 to contacts 166, 168 and 170, respectively. Contact 166 is connected to supply main power to the automatic control system. Contact 168 is connected to the automatic control system to signal the control system to compose a photograph by measuring the subject distance and the subject brightness. Contact 170 is connected to signal the camera control circuit 91 to complete a photographic operation. The camera control circuit 91 receives inputs from the various switches and sensors and controls the various solenoids in the apparatus shown in FIG. 1.

The Camera Control Circuit

Figure 2:
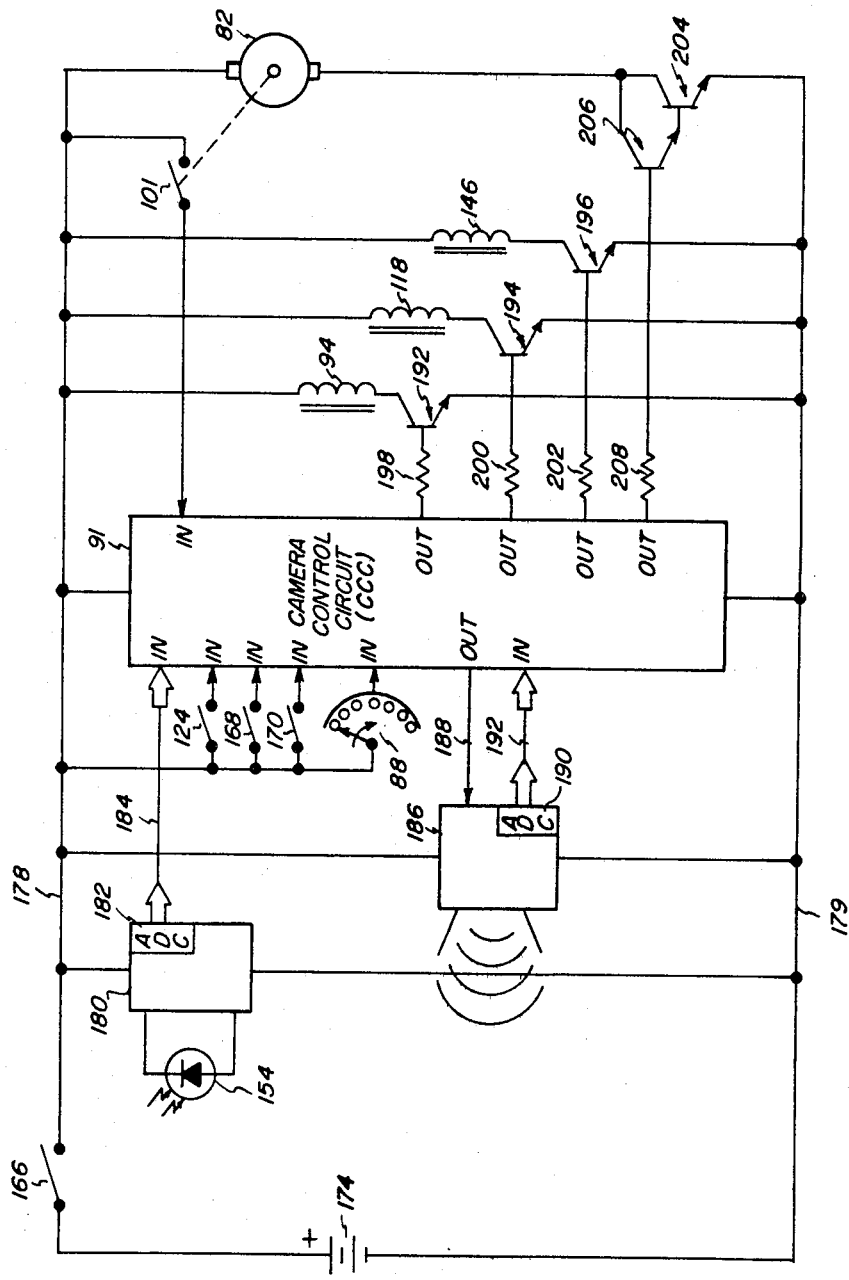
FIG. 2 is a schematic circuit diagram showing a camera control circuit comprising a microcomputer system and associated input and output transducers for use with the camera control mechanism of the present invention.

Turning now to FIG. 2, there is shown an overall circuit diagram employing a camera control circuit 91 for controlling the camera mechanism shown in FIG. 1. Switches and other elements shown in FIG. 2 are similarly numbered in FIG. 2.

Power for the circuit is obtained from a battery 174, the positive terminal of which is connected to a main power switch 166. The main power switch 166, when closed, connects the positive terminal of the battery to a positive bus 178. The negative terminal of the battery is connected to a return bus 179. Positive bus 178 supplies power to the camera control circuit 91. The return is provided to the camera control circuit by return bus 179. The specific structure of a preferred embodiment of the camera control circuit 91 will be described in further detail below.

A light-sensitive circuit 180 is connected between positive bus 178 and the return bus 179. The light-sensitive circuit includes a photosensitive element 154, such as a silicon photodiode, and suitable signal processing eletronics for generating a signal proportional to the brightness $B_s$ of the scene. The specific details of the light-sensitive circuit are not shown because the circuit does not constitute part of the present invention. Any number of light-sensitive circuits as employed in automatic exposure control systems are suitable for use herein, the only requirement being that the output signal of the circuit represent the brightness of the scene. This scene-brightness signal is converted to a digital signal suitable for use by the camera control circuit by an analog-to-digital converter 182 and is supplied in digital form to control system 172 on lines 184.

An automatic range-finding device 186 is also connected between positive bus 178 and return bus 179. The specific details of the range-finding device 186 are not shown because this device does not comprise a part of the present invention. Several of the presently known automatic range-finding devices are suitable for use herein. See, for example, the sonic range-finding device disclosed in U.S. Pat. No. 3,522,764 entitled RANGE FINDING AND FOCUSING SYSTEM FOR PHOTOGRAPHIC CAMERAS AND THE LIKE by C. H. Biber, granted Aug. 4, 1970, or the solide-state range-finding device disclosed in U.S. Pat. No. 3,945,023 entitled AUTO-FOCUS CAMERA WITH SOLID-STATE RANGE FINDER by N. L. Stauffer, granted Mar. 16, 1976. The range-finding device, when signalled by the camera control circuit 91 via line 188, determines the range to the main subject, i.e., that subject which is in a principal part of the picture, preferably designated by fiducial marks in the camera viewfinder. The range-finding device generates a signal $D_s$ indicative of the distance to the main subject. The distance signal is converted to a digital signal suitable for use by the automatic control system by an analog-to-digital converter 190 and is supplied in digital form to control system 172 on lines 192.

The control switch 124 which indicates that the shutter is open, the control switch 168 which directs the camera control circuit to measure scene light and subject distance, the control switch 170 which directs the automatic control system to take a picture, and the position sensor 88 which indicates the relative position of control lever 71 are all connected in parallel between positive bus 178 and the camera control circuit. When closed, the respective control switches provide logic signals to the camera control circuit.

Electromagnet 94 which activates the lens position latch, electromagnet 118 which holds the closing shutter blade latch, and electromagnet 146 which activates the aperture position latch are connected between the positive bus 178 and return bus 179 through the collector-to-emitter paths of transistors 192, 194 and 196, respectively. The base electrodes of the transistors 192, 194 and 196 are connected to the camera control circuit 91 through resistors 198, 200 and 202, respectively.

Positive bus 178 is also connected to one input of motor 82. The motor is controlled by transistor pair 204 and 206 connected in a Darlington configuration in the return leg of the motor circuit. The base of transistor 206 is connected, through resistor 208, to the camera control circuit. Switch 101 is mechanically coupled to the motor 82 via the control lever 71 (see FIG. 4) and electrically connected to the positive bus 178 for providing a signal to the camera control circuit 91.

The Camera Control Circuit

Figure 3:
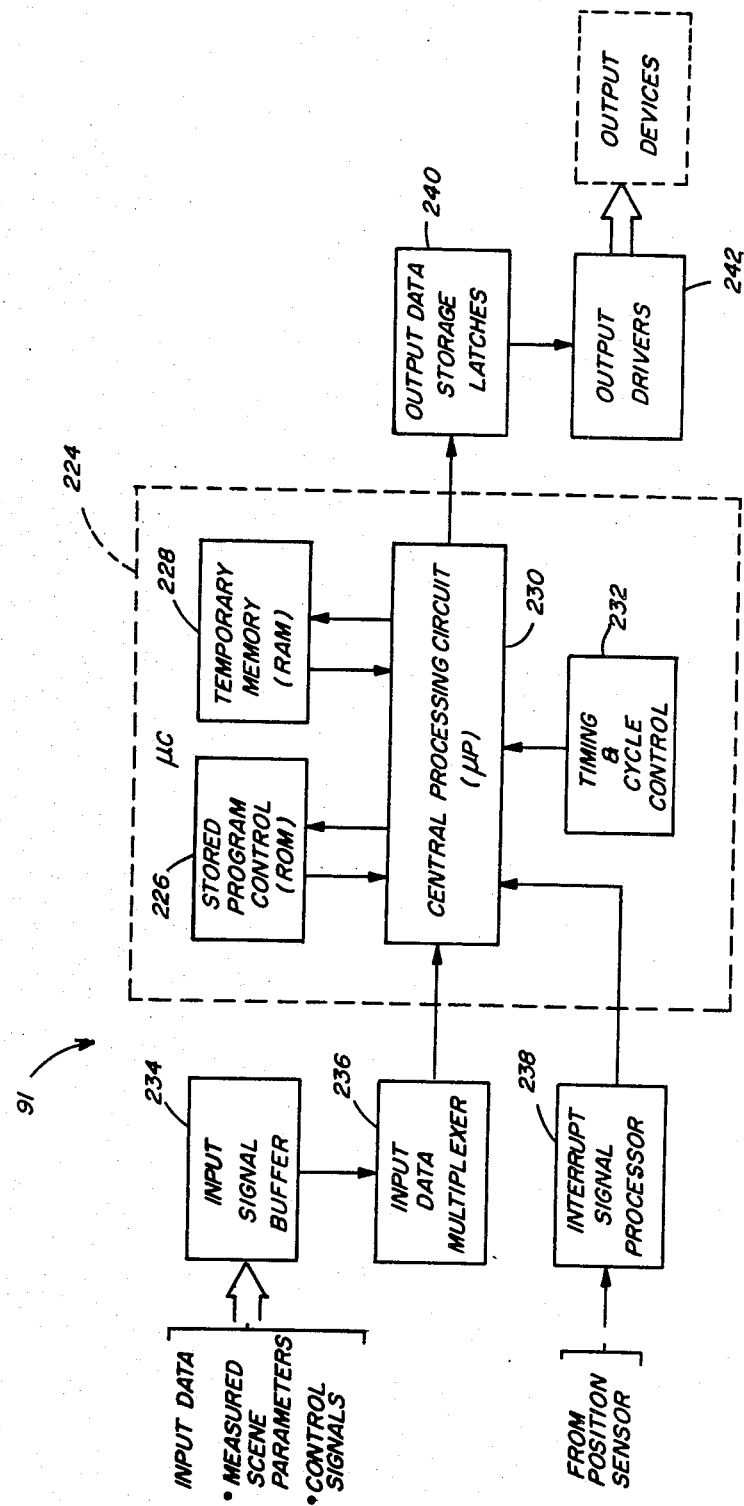
FIG. 3 is a block diagram of the camera control circuit shown in FIG. 2.

FIG. 3 shows the camera control circit 91 in more detail. The camera control circuit, which interfaces with the camera control mechanism of the present invention, is preferably embodied in a microcomputer 224 and its associated input and output signal-conditioning circuits. Although a microcomputer is described, it is to be understood that the control circuit could also be a custom-designed circuit. The microcomputer 224 includes a stored program control memory 226, a temporary data storage memory 228, a central processing circuit, i.e., a microprocessor 230, and a timing and cycle control unit 232.

Programming a microprocessor, such as an INTEL 8008 or Model 8080 microprocessor (which can be used in accordance with the present invention), is a skill well-understood in the art. The following disclosure is written to enable a programmer having ordinary skill in the art to produce an appropriate program for the computer. The particular details of any such program would, of course, depend upon the architecture of the selected computer.

Data input and output are performed sequentially under program control. Input data are applied through an input signal buffer 234 to a multiplexer 236 or directly to central processing unit 230 through an interrupt signal processor 238. The input signals to the input data multiplexer are derived from the various control switches 124, 168, 170 and 101 (see also FIG. 2) and the measured scene parameters are derived from analog-to-digital converters 182 and 190. The input signal to the interrupt signal processor is derived from position sensor 88. The output data and control signals are applied to storage latches 240 which, in turn, provide suitable control signals to output drivers 242. The output drivers are directly coupled to leads which supply control signals to output devices such as the motor 82 and electromagnets 94, 118 and 146. The automatic control system functions are determined by a program stored in the computer memory.

The program is located in the stored program control memory 226 which may comprise a conventional read-only memory (ROM). The ROM contains the operational program in the form of instructions and fixed binary numbers corresponding to numerical constants. These data are permanently stored in the ROM and are not altered by the computer operation.

Typically, the ROM 226 is programmed at the manufacturer's facility, and the instructions programmed provide the required control functions as described below. For a specific example, the total ROM capacity may be approximately 2000 bytes, each byte being 8 bits in length.

The temporary memory 228 may be provided by a conventional random access memory (RAM). RAM differs from ROM in two distinct characteristics:
(1) data stored in a RAM are destroyed by removal of power and
(2) the stored data are easily altered by writing new data into memory.

For example, the RAM capacity may be 256 bytes, each byte being 8 bits in length. Data such as subject distance and scene brightness and computed values for camera functions are stored in the RAM until the completion of a photographic cycle. The RAM is also used to store intermediate data generated by the computer in calculating the desired adjustments for the camera functions.

Figure 4:
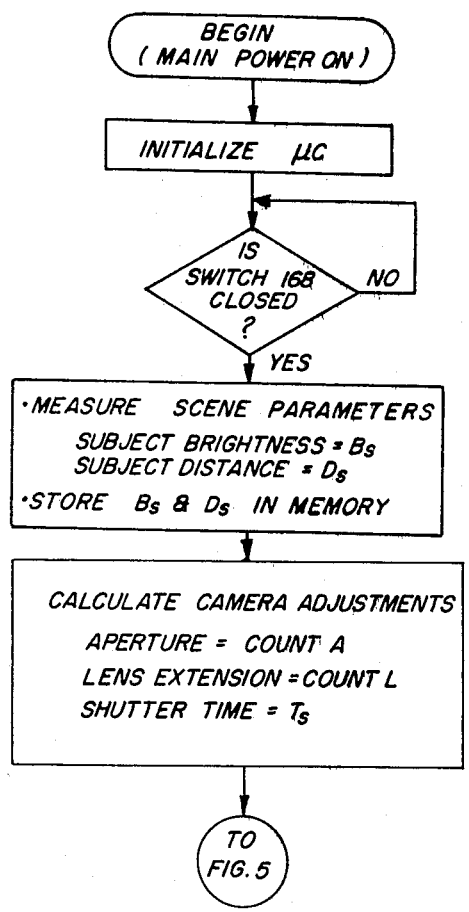
FIGS. 4–6 are flow charts showing the operation of the camera control circuit shown in FIG. 3.
Figure 5:
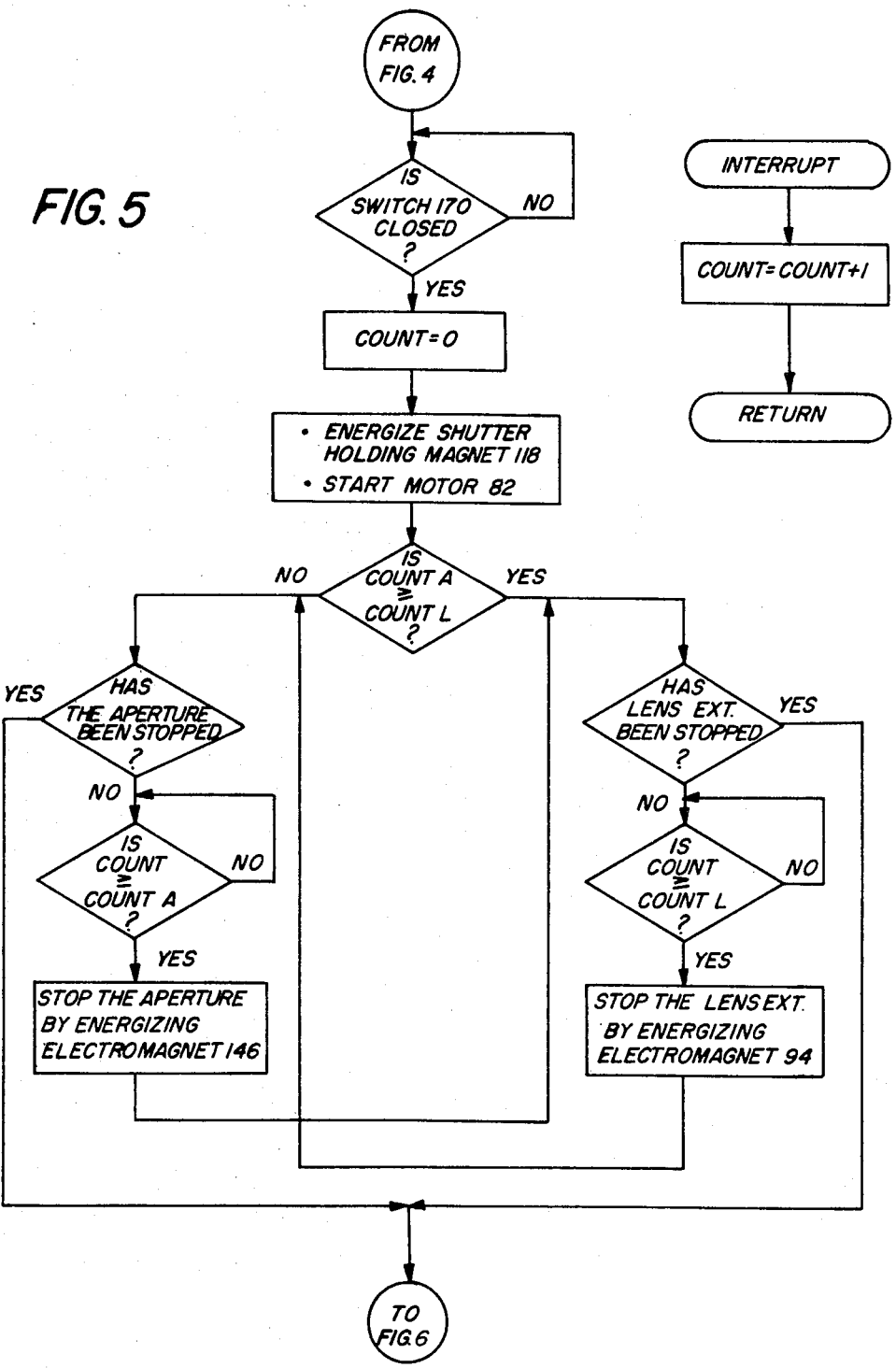
Figure 6:
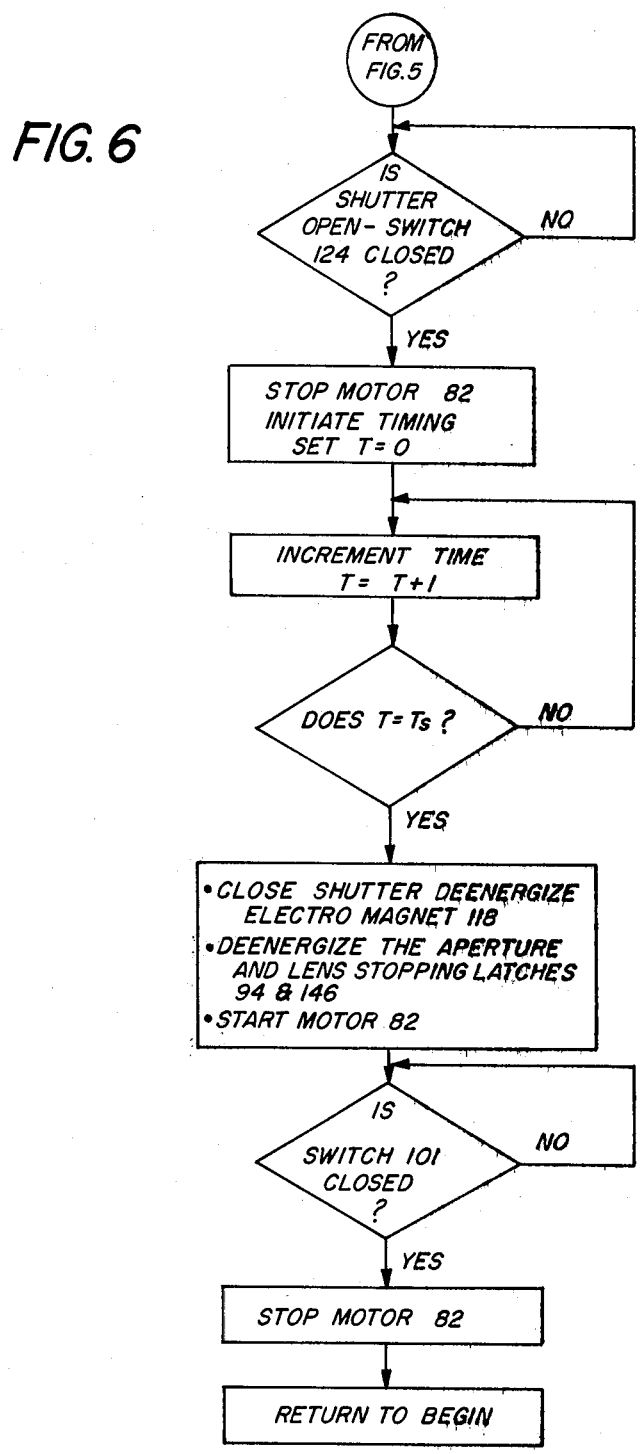

Turning now to FIGS. 4-6, there is shown a flow chart for the operation of the camera control circuit 91 (see also FIG. 1). To begin this operation, the photographer depresses the body release member 158 which closes switch 166, thereby applying power to the camera control system. The first thing which the computer 224 does is to determine, by sampling the input to the microprocessor from switch 168, whether the photographer wants to compose a picture. If switch 168 has been closed, a signal will be present at the input and the program will continue. If not, the program will wait until switch 168 is closed.

When switch 168 is closed, the computer senses the scene brightness by sampling the output on lines 184 from the light-sensitive circuit 180. The computer also senses the subject distance by applying a signal to line 188 to activate the automatic range-finder 186 and then samples the output on lines 192.

Signals representing the scene brightness $B_s$ and subject distance $D_s$ are stored in temporary memory 228. The computer then proceeds to calculate the camera adjustments required for taking the picture.

The computer calculates the desired aperture and lens extension in terms of counts from the position sensor 88 and the optimum shutter open time $T_s$. Count A represents the number of counts desired for the aperture and Count L represents the number of counts desired for the lens. These computed values are stored in temporary memory 228.

Proceeding to FIG. 5, the computer then checks to see whether a command has been given to take a picture, by sampling the input from switch 170. If the switch is open, the program waits until the switch is closed. When the presence of a signal indicates that the switch is closed, the program initializes a counter (by setting a variable COUNT=0) which will be used in setting lens and aperture positions. Next, the computer energizes the shutter holding magnet 118 so that the shutter will not close as soon as it is opened. The computer then starts motor 82 by activating the data storage latch which controls the output driver for the motor.

As the motor rotates cam 76 (see also FIG. 1) counterclockwise, cam follower 74 allows the multifunction control lever 71 to rotate counterclockwise under the influence of spring 78. The aperture and lens follow the motion of the multifunction control lever through their respective mechanical linkages. As multifunction control lever 71 moves, pulses are generated by the position sensor 88. Each pulse which is received by the computer from the position sensor causes a transfer to the interrupt routine shown in FIG. 5. The interrupt routine increments COUNT by 1 and then returns control to the place in the main program where the interrupt occurred. Meanwhile, the main program checks to see which is the larger, COUNT A or COUNT L.

If COUNT A is the larger, the program checks to see whether the lens has been stopped yet. At this stage of the operation, of course, the lens has not yet stopped but, as will be seen, this check is used later as a means of getting out of this portion of the program. Next, the computer checks to see if COUNT equals COUNT L. When it does, the computer causes the lens to stop by energizing electromagnet 94, thereby causing latch 93 to inhibit further motion of crank 58 to stop the lens at the desired position.

The computer then checks to see if the aperture has been stopped. Because COUNT A is larger than COUNT L in this example, of course, it has not; but this check is used to enable the program to continue after both the lens and the aperture have been set. The computer then checks to see whether COUNT is equal to or greater than COUNT A. When it is, the computer stops the aperture by applying a signal to the output drive which energizes electromagnet 146, thereby causing latch 142 to arrest further movement of the aperture. Next, the computer again checks to see whether the lens has previously been stopped. If it has been, the computer continues with the main program. Similarly, if COUNT A had been greater than COUNT L, the computer would have first set the aperture, then the lens, then continued as shown in FIG. 4. Subsequent interrupts caused by the pulses from sensor 88 continue to increment the COUNT but have no further effect on the execution of the main program.

Proceeding to FIG. 6, after the lens and aperture have been set, the computer waits for the shutter to open. This is indicated by a signal from switch 124. Upon receiving the signal that the shutter has opened, the computer stops the motor by removing the drive signal to the motor control circuit and intitiates an internal timing cycle by setting a variable $T=0$. Then the computer goes into a sequence of repeatedly incrementing T by 1 count and checking to see if it is time to close the shutter. When the proper time $T_s$ arrives, the computer signals the shutter to close.

The computer then prepares the apparatus for the next photographic cycle by de-energizing the lens-electromagnets 94 and 146. Motor 82 is then started to return the multifunction control lever 71 to its initial position. When the control lever reaches its initial position, the computer is signalled by the closing of switch 101 and the motor is stopped. The motor may also be coupled to a film advance mechanism adapted to advance film during this portion of the motor cycle.

The invention has been described in detail with reference to a preferred embodiment. Obviously, numerous modifications and variations are possible within the spirit and scope of the invention. For example, the multifunction control member 71 could be adapted to slide rather than pivot, or lens and aperture latches 93 and 142 could comprise various other latching means such as magnetic brakes.

I claim:

1. A control mechanism for use in a photographic camera, comprising:

a multifunction control member moveable between an initial position and a final position;

means for moving said control member from said initial position to said final position;

position sensor means, responsive to the movement of said control member for producing a signal representing the position of said control member;

adjustable lens means moveable from an initial position to a final position for providing a plurality of focus adjustments, said lens means including control member follower means for moving said adjustable lens means in concert with movement of said control member;

lens arresting means responsive to a focus control signal for arresting movement of said lens mean at one of said plurality of focus adjustments;

adjustable aperture means, moveable from an initial position to a final position for providing a plurality of aperture adjustments, said aperture means including control member follower means for moving said aperture means in concert with movement of said control member;

aperture arresting means responsive to an aperture control signal for arresting movement of said aperture means at one of said plurality of aperture adjustments; and control circuit means responsive to measured scene parameter inputs, including at least subject distance and brightness, and responsive to said position signal for producing said focus control signal and said aperture control signal.

2. The invention claimed in claim 1 further comprising:

shutter means moveable from a cocked closed condition to an open condition for initiating an exposure and moveable from said open condition to a run-down closed condition for terminating an exposure;

means for biasing said shutter means toward said open condition from said cocked closed condition; and latch means for holding said shutter means in said closed condition and responsive to said control member means reaching said final position for releasing said shutter to move to said open condition.

3. The invention claimed in claim 2, further comprising:

means for moving said control member to said initial position from said final position; and means responsive to the movement of said control member from said final position to said initial position for returning said lens means and said aperture means to said respective initial positions, and for returning said shutter means to said cocked closed condition.

4. The invention claimed in claim 1 wherein:

said position sensor means comprises a comb-shaped conductive track and a conductive wiper adapted for relative motion in response to movement of said control member to produce a series of pulses representing the position of said control member.

* * * * *